(No Model.)

C. E. WYMAN.
Harrow.

No. 231,386.    Patented Aug. 17, 1880.

Witnesses.
Franck L. Ouraud
H. Aubrey Toulmin.

Inventor
Charles E. Wyman
By Alexander Toulmin

UNITED STATES PATENT OFFICE.

CHARLES E. WYMAN, OF MARTINSBURG, INDIANA.

HARROW.

SPECIFICATION forming part of Letters Patent No. 231,386, dated August 17, 1880.

Application filed April 30, 1880. (No model.)

*To all whom it may concern:*

Be it known that I, CHARLES E. WYMAN, of Martinsburg, in the county of Washington, and in the State of Indiana, have invented certain new and useful Improvements in Harrows; and I do hereby declare that the following is a full, clear, and exact description thereof, reference being had to the accompanying drawings, and to the letters of reference marked thereon, making a part of this specification.

The nature of my invention consists in the construction and arrangement of a harrow, as will be hereinafter more fully set forth.

Figure 1:
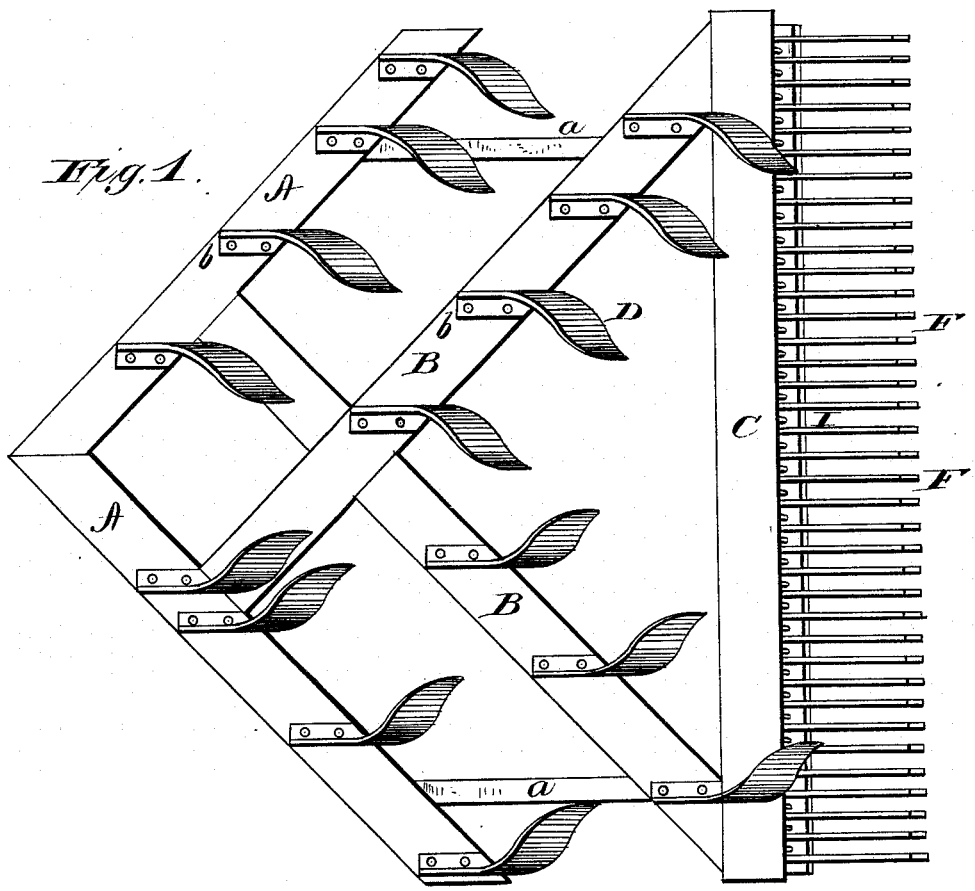
Figure 2:
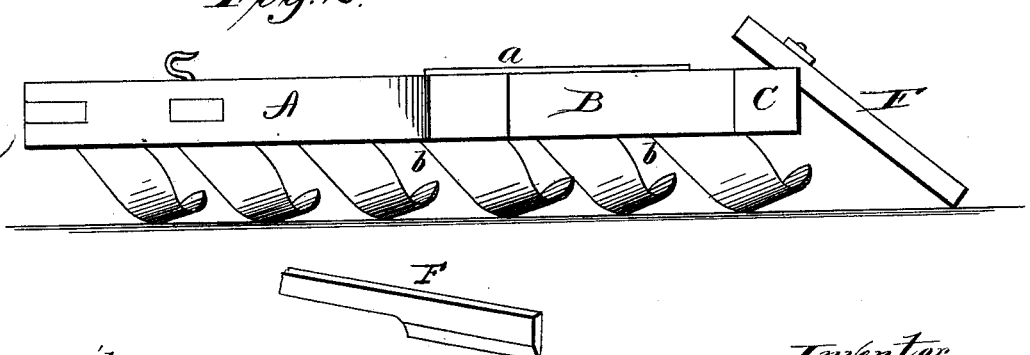

In the annexed drawings, Figure 1 is a bottom view, and Fig. 2 a side view, of my harrow.

The frame of my harrow is composed of two bars, A A, joined together at their front ends at about a right angle, and two other bars, B B, running parallel with them and framed together, as shown. At each side the two bars A B are connected by metal bars *a a*, and the rear ends of the bars B B are connected by a bar or head, C.

The harrow-frame thus constructed is provided with teeth or cutters D, made of steel in tapering form, coming down to a point at the lower end, with the front edge sharpened and the lower portion curled or twisted upward and backward. These teeth or cutters cut and pulverize the earth, and also turn it over. Any clods that may pass through without being cut will be cut by a series of knives, F F, set in the head C, and held by a bar, I, as shown. These knives are preferably made in the form of razor-blades, their lower portions being ground to a sharp edge, so as to cut and pulverize all clods that escape the front cutters, D.

The upper ends of the cutters D are formed with flanges *b*, through which bolts are passed for fastening the same to the frame.

Having thus fully described my invention, what I claim as new, and desire to secure by Letters Patent, is—

The within-described harrow, consisting of, first, the frame composed of the bars A A and B B, connecting-straps *a a*, and the head C; second, the steel teeth or cutters D, made in tapering form, coming to a point, having the front edges sharpened and their lower portions turned or twisted, as described; and, third, the razor-shaped blades F, set in the head C, and held by a bar, I, all constructed and arranged substantially as and for the purposes herein set forth.

In testimony that I claim the foregoing I have hereunto set my hand this 14th day of April, 1880.

CHAS. E. WYMAN.

Witnesses:
H. AUBREY TOULMIN,
SAML. L. BAKER.